(12) United States Patent
Oguma

(10) Patent No.: US 6,597,483 B1
(45) Date of Patent: Jul. 22, 2003

(54) LASER OSCILLATION WAVELENGTH MONITORING DEVICE

(75) Inventor: Takefumi Oguma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/379,347

(22) Filed: Aug. 23, 1999

(30) Foreign Application Priority Data

Sep. 4, 1998 (JP) .......................................... 10-250259

(51) Int. Cl.$^7$ .............................................. H04B 10/00
(52) U.S. Cl. ......................... 359/156; 359/123; 385/11; 385/32
(58) Field of Search ................................ 359/156, 123, 359/127; 385/11, 12, 15, 32

(56) References Cited

U.S. PATENT DOCUMENTS

| | | | |
|---|---|---|---|
| 4,768,854 A | * | 9/1988 | Campbell et al. .............. 385/32 |
| 4,972,515 A | * | 11/1990 | Shibutani ..................... 359/192 |
| 5,062,153 A | * | 10/1991 | Turpin et al. ................ 359/156 |
| 5,541,756 A | * | 7/1996 | Chang-Hasnain et al. .. 359/123 |
| 6,282,333 B1 | * | 8/2001 | Dultz et al. .................... 385/11 |
| 6,404,525 B1 | * | 6/2002 | Shimomura et al. ........ 359/127 |

FOREIGN PATENT DOCUMENTS

| | | |
|---|---|---|
| JP | 2236135 | 9/1990 |
| JP | 4331935 | 11/1992 |
| JP | 555683 | 3/1993 |
| JP | 720512 | 1/1995 |
| JP | 10-9961 | 1/1998 |

* cited by examiner

*Primary Examiner*—John Tweel
(74) *Attorney, Agent, or Firm*—Young & Thompson

(57) ABSTRACT

A laser oscillation wavelength monitoring device, which can obtain a changing direction and a changing amount of an oscillation wavelength without any relation with a polarization state of an incident light, whose manufacturing is made to be easy, is provided. The laser oscillation wavelength monitoring device provides a lens that converts an incident light from an optical fiber in which an optical signal is transmitted using wavelength division to a beam, a polarizer that makes an arbitrary linear polarization state in the beam transmit, a polarization splitter that splits the arbitrary linear polarization state into a first polarization state and a second polarization state, first and second optical band pass filters to which each polarization state split by the polarization splitter is inputted, first and second light receiving elements which receive light transmitted through the first and second optical band pass filters respectively and convert the received light to electric signals, a divider that calculates a ratio of digital values that the output levels of the first and second light receiving elements are converted at analog/digital (A/D) converters, an adder that accumulates the outputs of the divider every designated unit time, and a counter. And the laser oscillation wavelength monitoring device outputs an average value that the accumulated result designated times at the adder is divided by the counted value.

20 Claims, 6 Drawing Sheets

←------→ SHOWS POLARIZATION STATE

LASER OSCILLATION WAVELENGTH MONITORING DEVICE

BACKGROUND OF THE INVENTION

The present invention relates to a laser oscillation wavelength monitoring device which is in particular used at an optical fiber communication system utilizing a wavelength division multiplex (WDM) technology that implements optical transmission by multiplexing wavelengths of laser light sources of plural different wavelengths.

DESCRIPTION OF THE RELATED ART

At an optical transmission system, a WDM, which transmits plural wavelength light in one string of optical fiber, has been utilized. In this WDM application, as light sources, plural different wavelength laser light sources are needed.

In order to keep good transmission quality, it is necessary that the oscillation wavelengths are controlled in high accuracy, at these laser light sources.

At the control for the laser oscillation wavelength, a wavelength monitoring device using a dielectric multi layer film is used. Japanese Patent Application Laid-Open No. HEI 10-9961 discloses a wavelength monitoring device, which uses a dielectric multi layer film. FIG. 1 is a diagram showing the construction of this conventional wavelength monitoring device.

In this conventional wavelength monitoring device, a transmitted light through an optical band pass filter 24 (transmission center wavelength=monitoring wavelength "λa"), which is made of a dielectric multi layer film, is received at a photodiode 26 and a change of an oscillation wavelength of a laser light source 10 is monitored by a change of photo current. That is, the light inputted to an optical transmission line 12 from the laser light source 10 branches at directional couplers 14 and 20, and the light outputted from the directional coupler 14 is converted to an electric signal by a photodiode 16 and logarithmically amplified at a logarithmic amplifier 18. The light outputted from the directional coupler 20 is inputted to the photodiode 26 through the optical band pass filter 24. The optical band pass filter 24 is an optical element whose transmittance factor decreases corresponding to that a wavelength is shifted off the specific wavelength "λa" and the light outputted from the optical band pass filter 24 is converted to an electric signal by the photodiode 26 and logarithmically amplified at a logarithmic amplifier 28. A differential amplifier 30 outputs the difference between outputs of the logarithmic amplifiers 18 and 28, and a comparator 32 compares the output of the differential amplifier 30 with a threshold value Vref of an alarm, and at the time when the output of the differential amplifier 30 is more than the threshold value Vref, the comparator 32 outputs an alarm signal.

However, at the mentioned above conventional wavelength monitoring device, the transmission light intensity at the dielectric multi layer film is changed by a polarization state of an incident light. That is, there exists a polarization dependency, it is impossible to judge whether the change of the photo current is caused by the change of a laser oscillation wavelength or the change of the inputted polarization, therefore there is a problem that a wavelength monitoring in high accuracy is impossible.

SUMMARY OF THE INVENTION

It is therefore an object of the present invention to provide a laser oscillation wavelength monitoring device which can obtain a changing direction and a changing amount of the oscillation wavelength electrically by not affected by the polarization state of the incident light and can be easily manufactured.

According to the present invention, for achieving the object, a laser oscillation wavelength monitoring device provides a splitting means for splitting an incident light, which is inputted from an optical transmission line in which an optical signal from a laser light source is transmitted, into different polarization states, plural optical/electric converting means for converting the optical signals of each split polarization state to electric signals respectively, and an accumulating means for accumulating the ratios of said electric signals expressing the light intensity of said polarization states from said each optical/electric converting means, every designated unit time, designated times, and monitors a change of a laser oscillation wavelength of unit time, by compensating the change of the polarization state of said incident light, with averaging by time the ratios of the light intensity of the polarization states.

According to the present invention, a laser oscillation wavelength monitoring device provides an optical lens for converting an incident light, which is inputted from an optical transmission line in which an optical signal from a laser light source is transmitted, to a beam, a polarizer which makes an arbitrary linear polarized light in said beam transmit, an optical band pass filter means through which only a specific wavelength band light of said arbitrary linear polarized light is transmitted, a polarization splitting means for splitting the light transmitted through said optical band pass filter means into a first polarization state and a second polarization state, a first and a second optical/electric converting means for receiving said each polarization state split at said polarization splitting means respectively and converting said polarization states to electric signals, and an outputting means which accumulates the ratios of output levels of said first and second optical/electric converting means every designated unit time and averages the accumulated results of designated times and outputs the averaged result.

According to the present invention, by installing a laser oscillation monitoring device of the present invention in an optical fiber line, the laser oscillation wavelength is monitored without any relation with a polarization state of an incident light and a changing direction and a changing amount of the oscillation wavelength can be electrically obtained.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
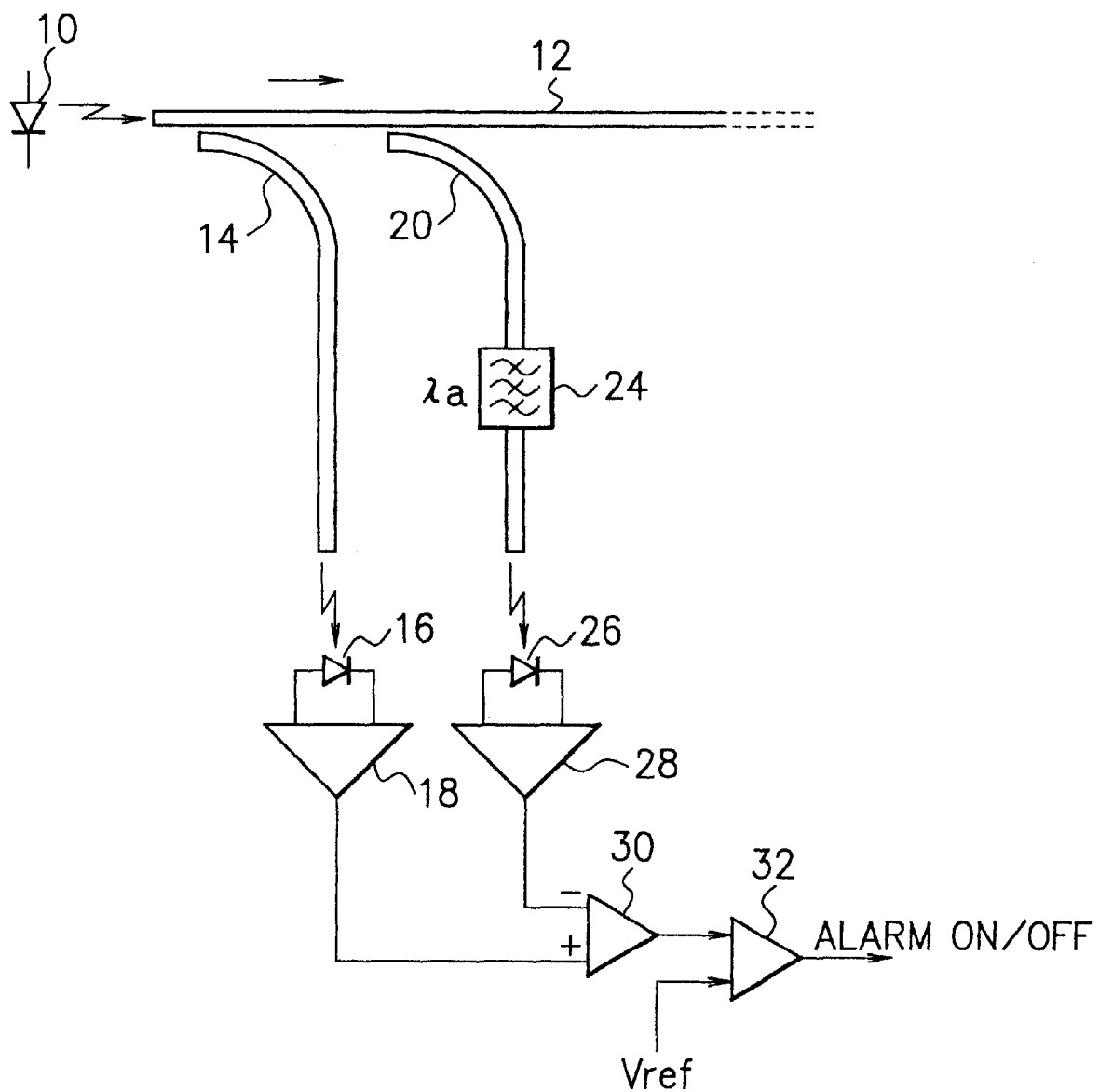
FIG. 1 is a diagram showing the construction of a conventional wavelength monitoring device.
Figure 2:
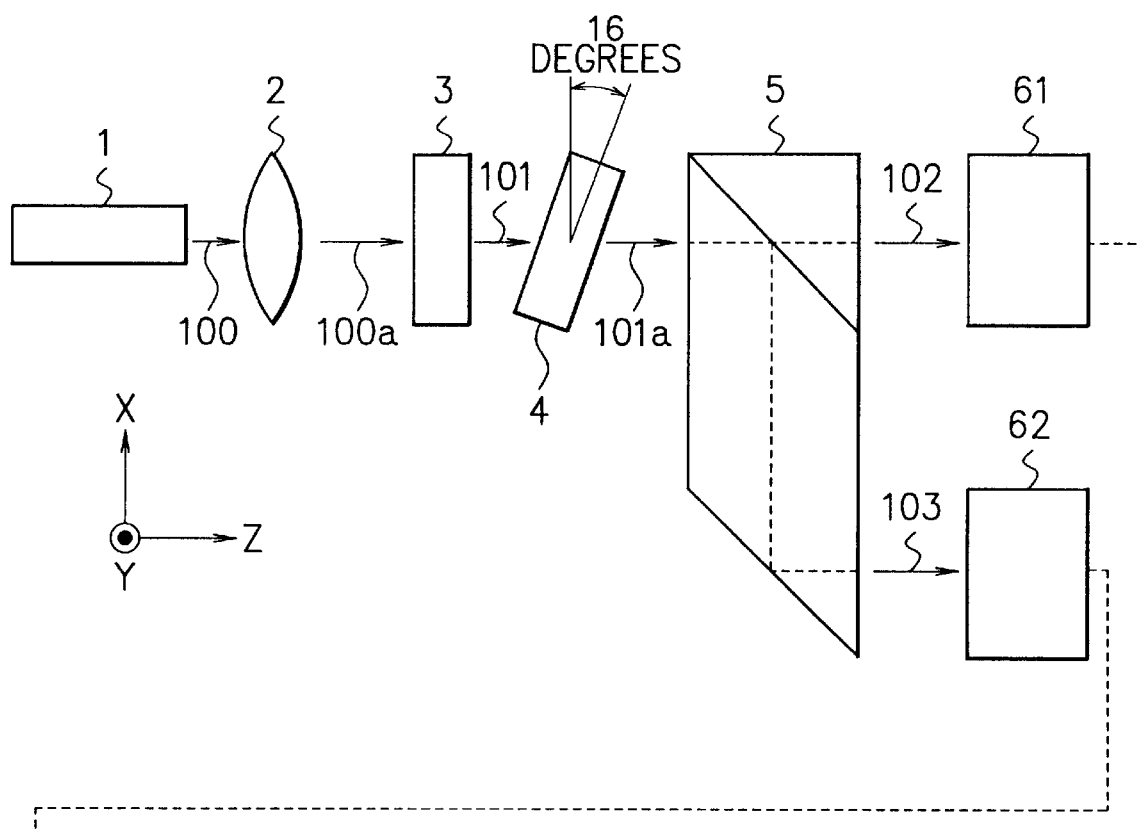
FIG. 2 is a diagram showing the construction of a first embodiment of the present invention.
Figure 2:
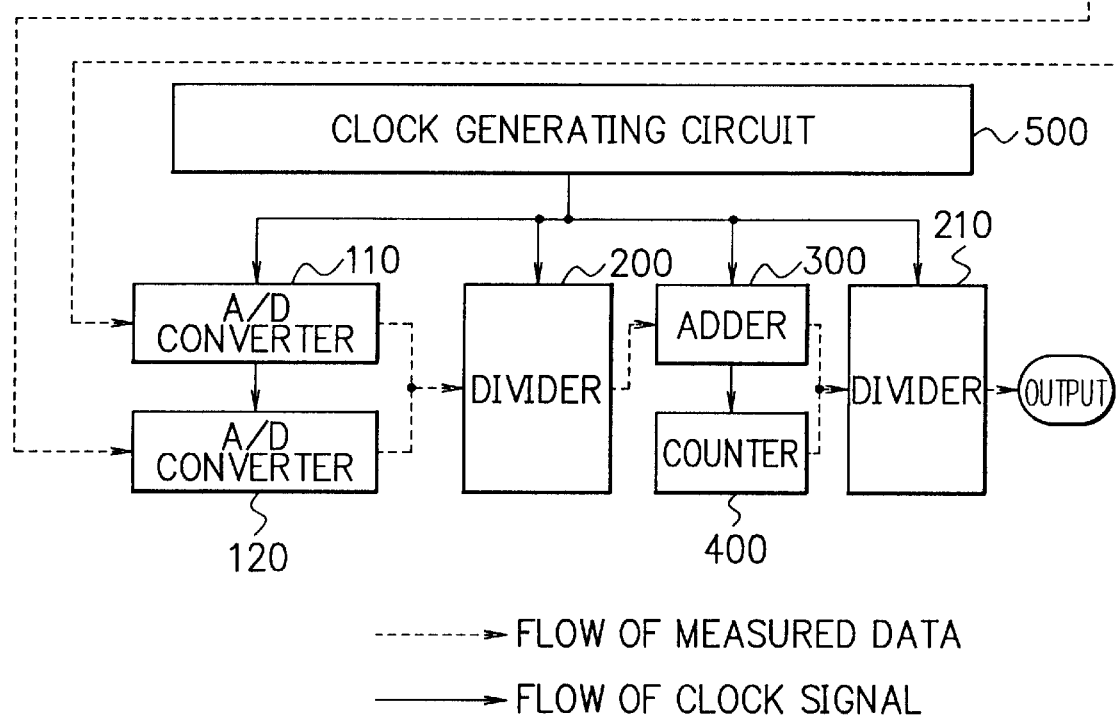

Referring now to the drawings, embodiments of the present invention are explained in detail. FIG. 2 is a diagram showing the construction of a first embodiment of the present invention. As shown in FIG. 2, the first embodiment of the present invention provides an optical fiber 1, a lens 2, a polarizer 3, an optical band pass filter 4, a polarization splitting element 5, a first light receiving element 61, a second light receiving element 62, a first analog/digital (A/D) converter 110, a second analog/digital (A/D) converter 120, a first divider 200, a second divider 210, an adder 300, a counter 400 and a clock generating circuit 500.

The optical fiber 1 is a single mode optical fiber and the lens 2 is a collimator lens that converts a light outputted from the optical fiber 1 to a beam.

Figure 3:
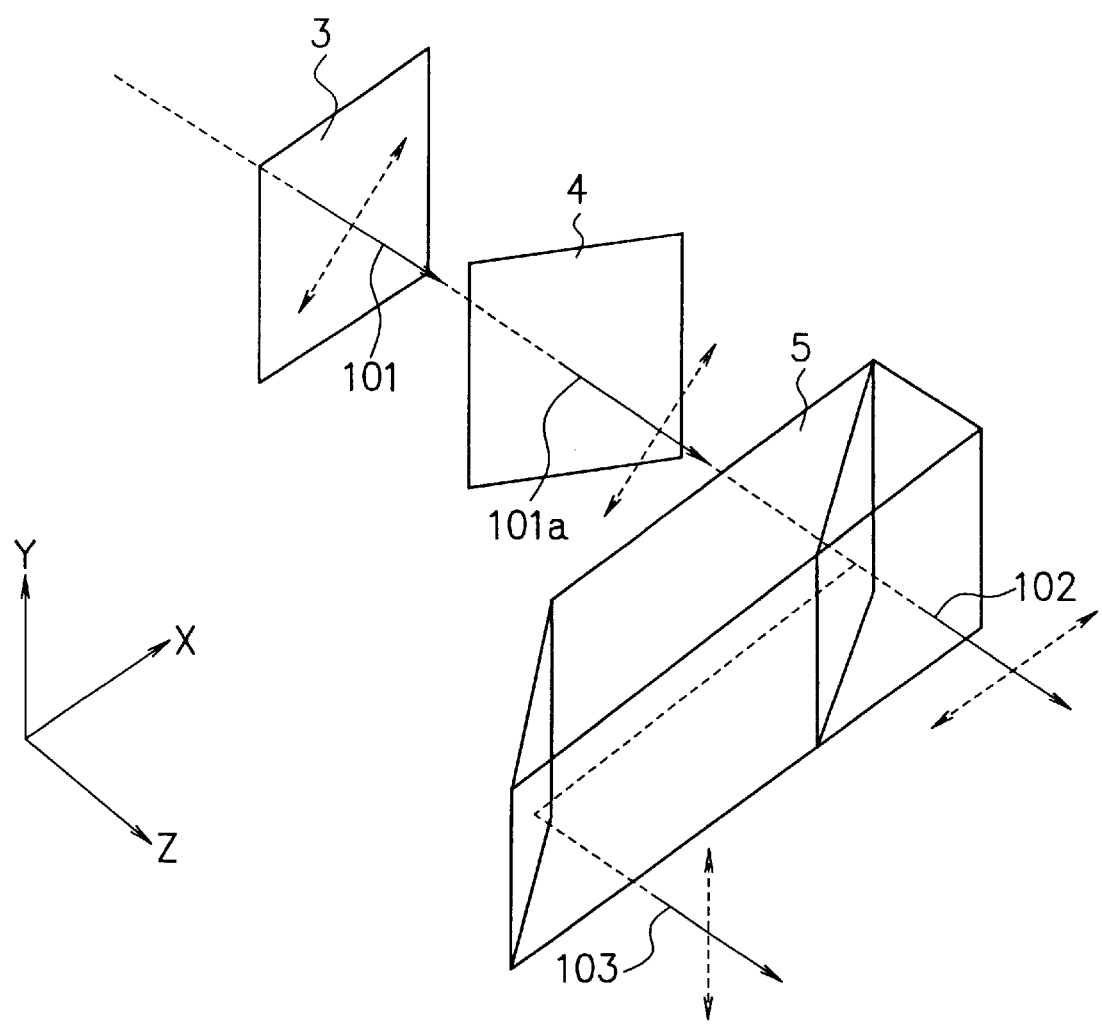
FIG. 3 is a perspective diagram showing the parts of a polarizer, an optical band pass filter and a polarization splitting element of the first embodiment of the present invention.

The polarizer 3 is an optical element that transmits only an arbitrary linear polarized light from the beam converted at the lens 2. FIG. 3 is a perspective diagram showing the parts of the polarizer 3, the optical band pass filter 4 and the polarization splitting element 5 of the first embodiment of the present invention. As shown in FIG. 3, the direction of the transmitting polarization is disposed at 45 degrees tilt angle for "x", "y" axes.

The optical band pass filter 4 is a narrow band optical band pass filter made of a dielectric multi layer film and is disposed at about 10 to 30 degree tilt angle for "x" axis in FIG. 3. The transmission center wavelength of the optical band pass filter 4 at a non-polarization state is adjusted at a monitoring wavelength "λc".

The polarization splitting element 5 is an element that splits polarization states of the light transmitted through the optical band pass filter 4, and is disposed in order that the polarization of "x" and "y" axes directions can be split.

The first and second light receiving elements 61 and 62 are photodiodes and receive each polarization state split at the polarization splitting element 5 and convert the polarization states to electric signals.

The first and second A/D converters 110 and 120 are circuits that convert photo currents inputted from the first and second light receiving elements 61 and 62 to 16 bit digital signals. It is also applicable that the photo currents inputted from the first and second light receiving elements 61 and 62 are converted to voltage signals and the voltage signals are inputted to the first and second A/D converters 110 and 120.

The first divider 200 is a circuit that divides the digital signals inputted from the first A/D converter 110 by the digital signals inputted from the second A/D converters 120, and outputs the divided result, in this the divided result is outputted in 16 bits of a fixed point.

The adder 300 is a circuit that latches and adds the output from the divider 200, and adds the inputted values (outputs from the divider 200) every clock signal inputted from the clock generating circuit 500. The adder 300 provides a buffer memory of 32 bits (not shown) and the added result is stored in this buffer memory. And the adder 300 outputs the values in the buffer memory of 32 bits by a data output request and also provides a circuit that makes the buffer memory clear.

The counter 400 is a circuit that counts the clock generated at the clock generating circuit 500. At the time when the counted value reaches a predetermined number of counts, the counter 400 outputs the number of counts at that time in 32 bits, and also outputs a data output request for the adder 300.

The second divider 210 is a circuit that divides the digital signals inputted from the adder 300 by the counted values from the counter 400, and outputs the divided result, in this the divided result is outputted in 16 bits of a fixed point.

Next, referring to FIGS. 2 and 3, the operation of the first embodiment of the present invention is explained.

A light 100 outputted from the optical fiber 1 is converted to a beam 100a at the lens 2, after this, the beam 100a is inputted to the polarizer 3. And only a linear polarized light 101 that is 45 degrees for "x" and "y" axes is transmitted. The linear polarized light 101 transmitted through the polarizer 3 is inputted to the optical band pass filter 4.

At this time, the linear polarized light 101 has a tilt angle of 45 degrees for "x" and "y" axes as shown in FIG. 3. Therefore, the effective refractive indexes at the optical band pass filter 4, between a linear polarized light 102 being a polarization state parallel to the "x" axis and a linear polarized light 103 being a polarization state parallel to the "y" axis in a linear polarized light 101a transmitted through the optical band pass filter 4, are different. And the transmission center wavelengths of the linear polarized light 102 and 103 are also different.

The linear polarized light 101a transmitted through the optical band pass filter 4 is split into the linear polarized light 102 being the polarization state parallel to the "x" axis and the linear polarized light 103 being the polarization state parallel to the "y" axis at the polarization splitting element 5. After this splitting, the linear polarized light 102 and 103 are inputted to the first and second light receiving elements 61 and 62 respectively, and the photo currents are obtained corresponding to the incident light intensity.

The photo currents from the first and second light receiving elements 61 and 62 are inputted to the first and second A/D converters 110 and 120, and converted to the digital signals of 16 bits. After this, the digital signals are divided at the divider 200 and the ratio of the photo currents is outputted.

The output from the divider 200 is inputted to the adder 300 and added to the values in the buffer memory of the adder 300. After this, the added result is stored in the buffer memory again and is accumulated.

The adder 300 continues this accumulating operation until the data output request signal from the counter 400 is received.

At the case that the adder 300 receives the data output request signal from the counter 400, the adder 300 stops the accumulating operation and outputs the values in the buffer memory of that time to the second divider 210 and makes the buffer memory clear.

The clock generating circuit 500 outputs clock signals to the first and second A/D converters 110 and 120, the first and second dividers 200 and 210, the adder 300 and the counter 400 at the designated operating clock. These circuits are operated by synchronizing with the inputted clock signals.

The counter 400 counts the clock signals from the clock generating circuit 500, and at the time when the counted value reaches the predetermined number of counts, implements the data output request to the adder 300 and at the same time outputs the number of counts to the divider 210.

The divider 210 divides the output value from the adder 300 by the output value from the counter 400 and outputs the divided result.

At the case that the wavelength of the light 100, that is, the laser oscillation wavelength is the monitoring wavelength "λc", the ratio of the light intensity between the linear polarized light 102 and 103 is a constant value.

However, at the case that the laser oscillation wavelength is shifted, the filter transmission center wavelengths of the linear polarized light 102 and 103 are different, therefore the ratio of the light intensity between the linear polarized light 102 and 103 is changed.

The change of the ratio of the light intensity is the change of the incident light intensity to the first and second light receiving elements 61 and 62, and the ratio of the photo currents from the first and second light receiving elements 61 and 62 is also changed.

At the case that the laser oscillation wavelength does not change and the polarization state of the incident light from the optical fiber 1 changes, the absolute values of the photo currents of the first and second light receiving elements 61 and 62 change, but the ratio of the two photo currents does not change.

Generally, the change of the laser oscillation wavelength is caused by the passage of time and occurs in a few months, however the change of the polarization state occurs, for example, in a few seconds to a few minutes. Therefore, by obtaining the ratio of the average values of the photo currents in a few seconds or a few minutes, the change of the polarization state can be cancelled.

As mentioned above, by averaging the ratio of the photo currents of the first and second light receiving elements 61 and 62 in unit time, by using the adder 300 and the counter 400, the change of the polarization state of the incident light is cancelled, and the change of the laser oscillation wavelength in unit time can be known accurately.

Figure 4:
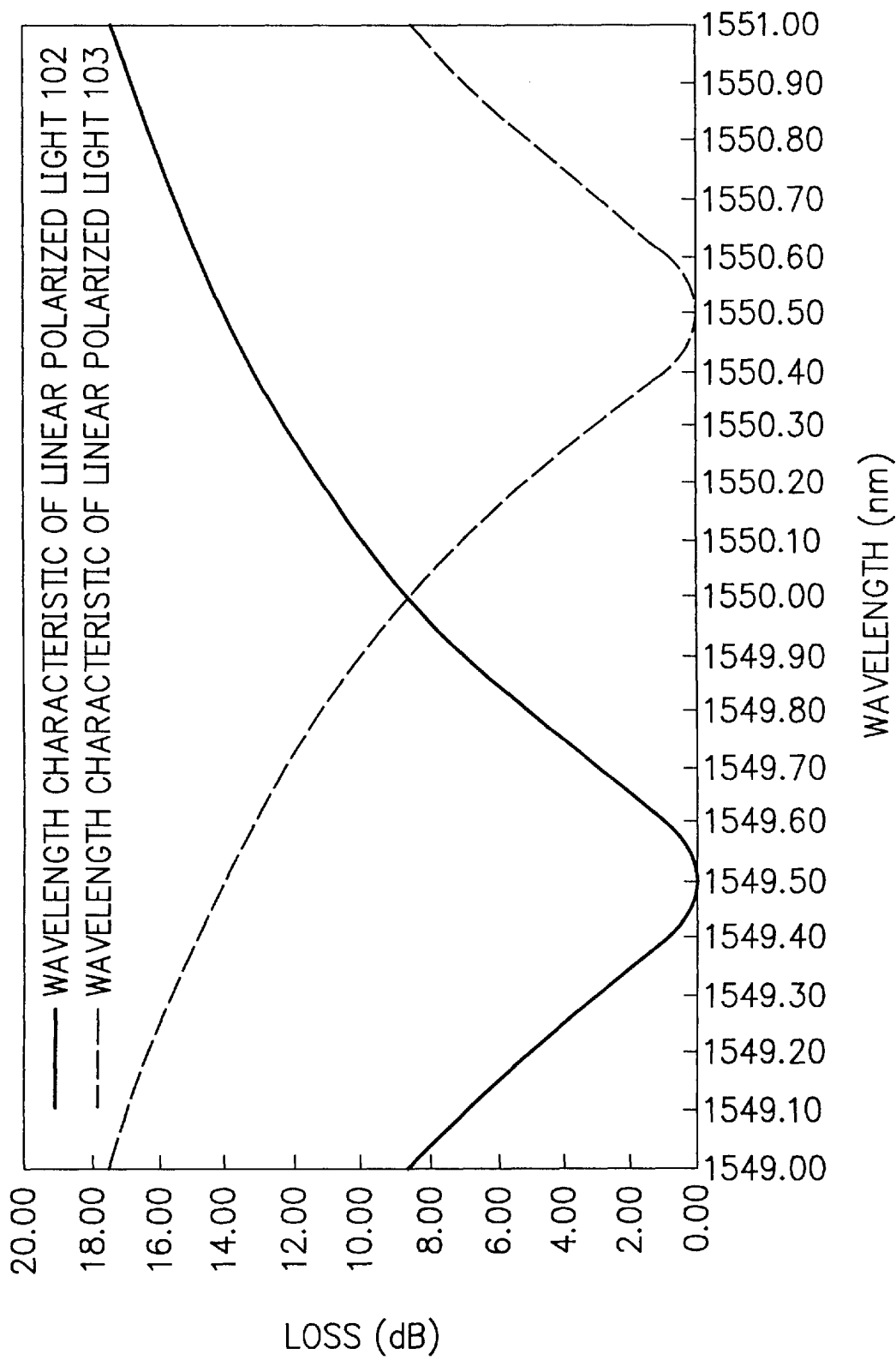
FIG. 4 is a diagram showing the wavelength characteristics of the transmission loss of the linear polarized light.

Referring to FIGS. 2 and 4, the first embodiment of the present invention is explained in more detail. FIG. 4 is a diagram showing the wavelength characteristics of the transmission loss of the linear polarized light 102 and 103.

Referring to FIG. 2, the optical fiber 1 is a single mode optical fiber and the lens 2 converts the light outputted form the optical fiber 1 to a beam whose diameter is 300 μm. At this embodiment, in order to prevent the deterioration of the coupling efficiency, an aspherical lens is used as the lens 2.

The polarizer 3 is an optical element that selectively transmits only an arbitrary linear polarized light from the beam converted at the lens 2. In this embodiment, in order to obtain a high excision ratio, a polarizer, which absorbs polarization states except the transmitting polarization (for example, model name: Polarcore, made by Corning Co.), is used. The transmitting polarization direction of the polarizer 3 is disposed at a 45 degree tilt angle for the "x" and "y" axes as shown in FIG. 3.

The optical band pass filter 4 is an optical band pass filter being a narrow band made of a dielectric multi layer film on a glass substrate of 0.3 mm thickness. The full width half maximum (FWHM) of the optical band pass filter 4 at the non-polarization state is 0.4 nm and the transmission center wavelength is adjusted to the required laser oscillation wavelength 1550.000 nm, and the angle for the "x" axis of the optical band pass filter 4 is 16 degrees at that time.

The polarization splitting element 5 is a polarization beam splitter (PBS) prism that splits the polarization states of light transmitted the optical band pass filter 4 and is disposed at the position that the polarization states parallel to the "x" and "y" axes can be split.

The first and second light receiving elements 61 and 62 are PIN photodiodes whose effective aperture diameter is 500 μm, and receive the linear polarized light states 102 and 103 split by the polarization splitting element 5 respectively, and convert them to electric signals.

As the polarizer 3 and the polarization splitting element 5, a double refraction substance, such as rutile can be used as an alternative.

The first and second A/D converters 110 and 120 are A/D converting circuits that convert the photo currents from the first and second light receiving elements 61 and 62 to digital signals of 16 bits. At these A/D converters 110 and 120, by converting the photo currents to voltages, voltage inputting type A/D converters are usable.

The first divider 200 is a circuit to which the digital signals from the first and second A/D converters 110 and 120 are inputted, and at which the digital signals are divided and from which the divided result is outputted. This output is a fixed point of 16 bits.

The adder 300 is a circuit, which latches and adds the output from the divider 200, adds the inputted values from the divider 200 every clock signal inputted from the clock generating circuit 500. As an adder, an accumulator on the market is usable.

The adder 300 provides a buffer memory (register) of 32 bits and stores the added result. And by a request, values in the buffer memory are outputted in 32 bits, and the adder 300 also provides a circuit to make the buffer memory clear.

The counter 400 is a circuit that counts clocks generated by the clock generating circuit 500, and outputs the number of counts at that time in 32 bits, for example, 180000 counts per hour, and outputs a signal that makes the adder 300 output data.

The second divider 210 is a circuit that divides the digital signals outputted from the adder 300 by the values outputted from the counter 400, the output is a fixed point of 16 bits.

The clock generating circuit 500, for example, generates clock of 50 Hz, and the first and second A/D converters 110 and 120 implement sampling for the output of the first and second light receiving elements 61 and 62 with this clock. And the first and second divider 200 and 210, the adder 300 and the counter 400 implement the operation synchronizing with this clock. These circuits can be formed in one chip IC by utilizing a digital signal processor (DSP).

Referring to FIGS. 2 and 4, the wavelength monitoring operation of the first embodiment of the present invention is explained. The light 100 outputted from the optical fiber 1 is converted to the beam 100a by the lens 2 and after this the beam 100a is inputted to the polarizer 3. Only linear polarized light 101, which is 45 degrees for "x" and "y" axes, is transmitted through the polarizer 3.

The linear polarized light 101 transmitted through the polarizer 3 is inputted to the optical band pass filter 4. The linear polarized light 101a transmitted through the optical band pass filter 4 is split into the linear polarized light 102 which is a polarization state parallel to the "x" axis and the linear polarized light 103 which is a polarization state parallel to the "y" axis at the polarization splitting element 5. And the linear polarized light 102 and 103 are inputted to he first and second light receiving elements 61 and 62 respectively and he photo currents corresponding to the incident light intensity are obtained.

At this time, the linear polarized light 101 has a 45 degree tilt angle for the "x" and "y" axes as shown in FIG. 3. Therefore, the effective refractive indexes for the optical band pass filter 4 between the linear polarized light 102 being the polarization state parallel to the "x" axis and the linear polarized light 103 being the polarization state parallel to the "y" axis are different, in the linear polarized light 101a transmitted through the optical band pass filter 4.

Therefore, at the case that the linear polarized light 101 is a white light, the transmission spectrums between the linear polarized light 102 and 103 are different. Actually, the filter transmission center wavelength of the linear polarized light 102 shifts to the short wavelength side, compared with the filter transmission center wavelength of the linear polarized light 103. The transmission spectrums of the linear polarized light 102 and 103 are shown in FIG. 4. In FIG. 4, the continuous line shows the wavelength characteristic of the linear polarized light 102 and the broken line shows the wavelength characteristic of the linear polarized light 103.

The linear polarized light 101a transmitted through the optical band pass filter 4 is split into the linear polarized light 102 which is a polarization state parallel to the "x" axis and the linear polarized light 103 which is a polarization state parallel to the "y" axis at the polarization splitting element 5. And the linear polarized light 102 and 103 are inputted to the first and second light receiving elements 61 and 62 respectively and the photo currents corresponding to the incident light intensity can be obtained.

The photo currents from the first and second light receiving elements 61 and 62 are inputted to the first and second A/D converters 110 and 120 and are converted to digital signals of 16 bits and are compared at the divider 200 and the ratio of the photo currents from these two light receiving elements is outputted.

The output from the divider 200 is inputted to the adder 300 and is added to the values storing in the buffer memory and the added result is stored again in the buffer memory.

The adder 300 continues the accumulating operation until the adder 300 receives the data output request signal from the counter 400. At the case that the adder 300 receives the data output request signal, the adder 300 stops adding operation and outputs the values in the buffer memory at that time to the divider 210 and makes the buffer memory clear.

The clock generating circuit 500 supplies clock signals of 50 Hz to the first and second A/D converters 110 and 120, the first and second dividers 200 and 210, the adder 300 and the counter 400, and these converters, dividers, adder and counter operate synchronizing with the clock signals.

The counter 400 counts the clock signals from the clock generating circuit 500. At the time when the count reaches 180000 counts (one hour), the counter 400 requests the adder 300 to output data and at the same time outputs the number of counts to the second divider 210 and makes the count clear.

The second divider 210 divides the values outputted from the adder 300 by the values outputted from the counter 400 and outputs the divided value. At the case that the count values are fixed, for example, at 180000 counts, the divisor of the second divider 210 can be set to a fixed value.

For example, at the case that the wavelength of the light 100, that is, the laser oscillation wavelength is desirable 1550.000 nm, the transmission loss of the linear polarized light 102 and 103 is the same at the optical band pass filter 4 and is about 8 dB, as shown in FIG. 4. At this time, the photo currents obtained at the light receiving elements 61 and 62 are 130 $\mu$A respectively.

Next, at the case that the wavelength of the light 100 is shifted to 1549.900 nm, as shown in FIG. 4, the transmission loss of the linear polarized light 102 becomes small but the transmission loss of the linear polarized light 103 becomes large at the optical band pass filter 4.

At this case, the transmission loss of the linear polarized light 102 becomes about 7 dB, but the transmission loss of the linear polarized light 103 is about 10 dB.

Therefore, the light intensity inputting to the first and second light receiving elements 61 and 62 is different, consequently the photo currents obtained are changed. The photo current obtained at the first light receiving element 61 is about 152 $\mu$A and the photo current obtained at the second light receiving element 62 is about 110 $\mu$A.

Figure 5:
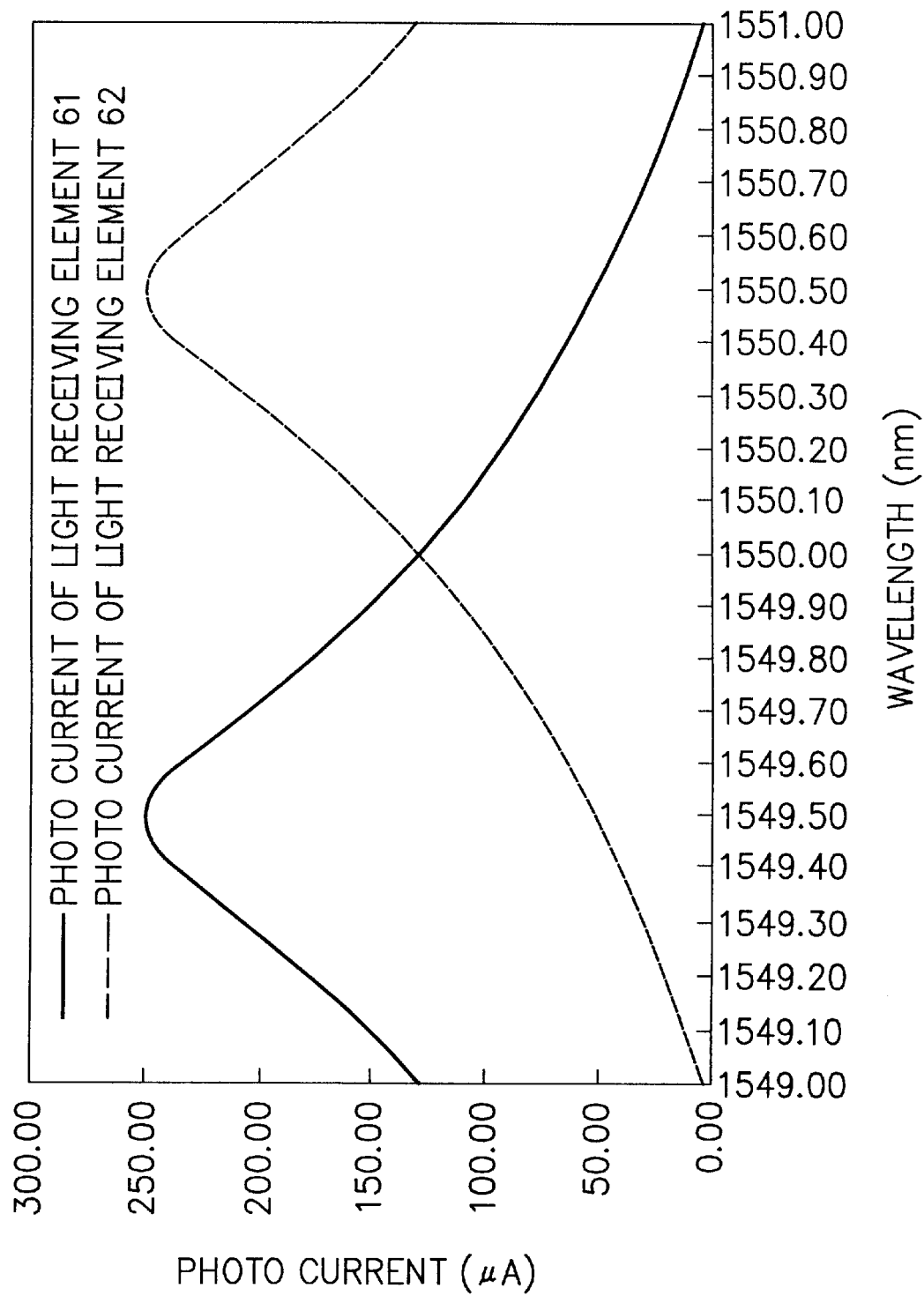
FIG. 5 is a diagram showing the wavelength characteristics of photo currents of light receiving elements.

FIG. 5 is a diagram showing the wavelength characteristics of photo currents of light receiving elements. The photo currents obtained at the first and second light receiving elements 61 and 62 are different by the wavelength of light 100, as shown in FIG. 5, at the case that the light 100 shifts to the side of short wavelength, the photo current of the first light receiving element 61 increases compared with that of the second light receiving element 62. At the case that the light 100 shifts to the side of long wavelength, the photo current of the first light receiving element 61 decreases compared with that of the second light receiving element 62.

Therefore, by monitoring the photo currents of the first and second light receiving elements 61 and 62, the change of the wavelength and the direction of the light 100 can be monitored.

Next, at the case that the polarization state of the light 100 changes, the light intensity of the linear polarized light 101 transmitted through the polarizer 3 changes. Therefore, the light intensity of the linear polarized light 102 and 103 transmitted through the polarization splitting element 5 also changes, and the photo currents generated at the first and second light receiving elements 61 and 62 also change.

Generally, the change of the laser oscillation wavelength is caused by the passage of time and occurs in a few months, however the change of the polarization state occurs in a few seconds to a few minutes. Therefore, by obtaining the ratio of the average values of the photo currents in a few seconds or a few minutes, the change of the polarization state can be cancelled.

At the first embodiment of the present invention, by averaging the ratios of the photo currents of the first and second light receiving elements 61 and 62 at unit time by using the adder 300 and the counter 400, the change of the polarization state of the incident light is made to cancel. With this, the change of the laser oscillation wavelength at unit time can be obtained accurately.

Figure 6:
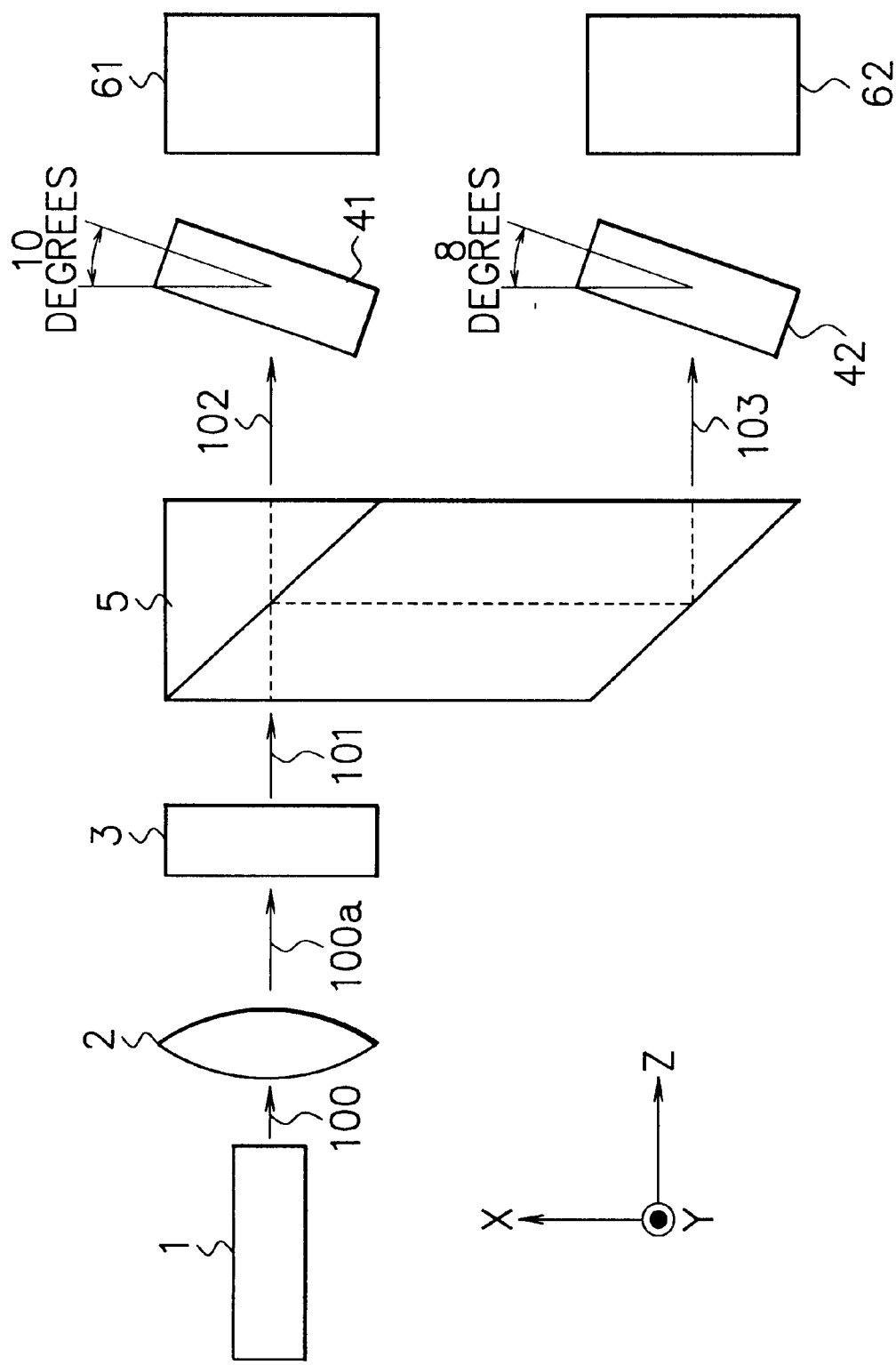
FIG. 6 is a diagram showing the construction of a second embodiment of the present invention.

Next, a second embodiment of the present invention is explained. FIG. 6 is a diagram showing the construction of the second embodiment of the present invention. As shown in FIG. 6, at the second embodiment of the present invention, instead of the optical band pass filter 4 at the first embodiment, a first and a second optical band pass filters 41 and 42 are provided between the polarization splitting element 5, and the first and second light receiving elements 61 and 62.

The first and second optical band pass filters 41 and 42 are the same as the optical band pass filter 4 at the first embodiment, the transmission center wavelengths are adjusted to 1549.500 nm and 1550.500 nm respectively and the light inputting angles at that time are 10 degrees and 8 degrees respectively. The wavelength of the laser light source is 1550 nm.

At the second embodiment, only the construction and the disposition of the optical band pass filters 41 and 42 are different from the first embodiment, the construction after the first and second light receiving elements 61 and 62 is the same as the first embodiment.

As explained above, the first effect of the present invention is that the changing direction and the changing amount of the oscillation wavelength can be electrically detected. Because, at the present invention, the monitoring light is split into two lights whose transmission center wavelengths are different and the two lights are received at the different light receiving elements and the photo currents are monitored.

Moreover, the second effect of the present invention is that the operation of monitoring the wavelength is possible without depending on the polarization state and the intensity of the incident light. Because, at the present invention, by using the polarizer and the polarization splitting element, the change of the polarization state of the incident light is converted to the change of the light intensity and the change of the polarization state of the incident light is compensated and the ratio of the photo currents from each light receiving element is outputted as the average value at unit time.

Furthermore, the third effect of the present invention is that the manufacturing the laser oscillation wavelength monitoring device is made to be easy. Because, at the present invention, the incident light is inputted by making the incident light the non-polarization state, and by adjusting the center wavelength of the optical band pass filter, it is possible that the filter center wavelength is easily adjusted to the operating point (laser oscillation wavelength).

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A laser oscillation wavelength monitoring device, comprising:
    a splitting means for splitting an incident light, which is inputted from an optical transmission line in which an optical signal from a laser light source is transmitted, into different polarization states;
    plural optical/electric converting means for converting the optical signals of each split polarization state to electric signals respectively; and
    an accumulating means for accumulating the ratios of said electric signals expressing the light intensity of said polarization states from said each optical/electric converting means, for every designated unit time, at designated times,
    and monitoring a change of a laser oscillation wavelength of unit time, by compensating the change of the polarization state of said incident light, with averaging by time the ratios of the light intensity of the polarization states.

2. A laser oscillation wavelength monitoring device, comprising:
    an optical lens for converting an incident light, which is inputted from an optical transmission line in which an optical signal from a laser light source is transmitted, to a beam;
    a polarizer which makes an arbitrary linear polarized light in said beam transmit;
    an optical band pass filter means through which only a specific wavelength band light of said arbitrary linear polarized light is transmitted;
    a polarization splitting means for splitting the light transmitted through said optical band pass filter means into a first polarization state and a second polarization state;
    a first and a second optical/electric converting means for receiving said each polarization state split at said polarization splitting means respectively and converting said polarization states to electric signals; and
    an outputting means which accumulates the ratios of output levels of said first and second optical/electric converting means every designated unit time and averages the accumulated results of designated times and outputs the averaged result.

3. A laser oscillation wavelength monitoring device, comprising:
    an optical lens for converting an incident light, which is inputted from an optical fiber in which an optical signal from a laser light source is transmitted, to a beam;
    a polarizer which makes an arbitrary linear polarized light in said beam transmit;
    an optical band pass filter means through which only a specific wavelength band light of said arbitrary linear polarized light is transmitted;
    a polarization splitting means for splitting the light transmitted through said optical band pass filter means into a first polarization state and a second polarization state;
    a first and a second optical/electric converting means for receiving said each polarization state split at said polarization splitting means respectively and converting said polarization states to electric signals;
    a first calculating means for calculating the ratio of output levels of said first and second optical/electric converting means;
    a second calculating means for accumulating outputs of said first calculating means every designated unit time; and
    a third calculating means for averaging by time the accumulated result designated times at said second calculating means and outputting the averaged result.

4. A laser oscillation wavelength monitoring device, comprising:
    an optical lens for converting an incident light, which is inputted from an optical fiber in which an optical signal from a laser light source is transmitted, to a beam;
    a polarizer which makes an arbitrary linear polarized light in said beam transmit;
    a polarization splitting means for splitting said arbitrary linear polarized light transmitted at said polarizer into a first polarization state and a second polarization state;
    a first and a second optical band pass filter means to which each polarization state split at said polarization splitting means is inputted;
    a first and a second optical/electric converting means for receiving said light transmitted through said first and second optical band pass filter means respectively and converting said received light to electric signals;
    a first calculating means for calculating the ratio of output levels of said first and second optical/electric converting means;
    a second calculating means for accumulating outputs of said first calculating means every designated unit time; and
    a third calculating means for averaging by time the accumulated result designated times at said second calculating means and outputting the averaged result.

5. A laser oscillation wavelength monitoring device in accordance with claim 3, wherein:
    said third calculating means outputs a value that said accumulated result designated times at said second calculating means is divided by said designated times.

6. A laser oscillation wavelength monitoring device in accordance with claim 4, wherein:

said third calculating means outputs a value that said accumulated result designated times at said second calculating means is divided by said designated times.

7. A laser oscillation wavelength monitoring device in accordance with claim 2, wherein:

said optical band pass filter means is a narrow band optical band pass filter made of a dielectric multi layer film and is disposed at a designated tilt angle for an optical axis.

8. A laser oscillation wavelength monitoring device in accordance with claim 3, wherein:

said optical band pass filter means is a narrow band optical band pass filter made of a dielectric multi layer film and is disposed at a designated tilt angle for an optical axis.

9. A laser oscillation wavelength monitoring device in accordance with claim 4, wherein:

said optical band pass filter means are narrow band optical band pass filters made of a dielectric multi layer film and are disposed at designated tilt angles for an optical axis.

10. A laser oscillation wavelength monitoring device in accordance with claim 2, wherein:

a transmission center wavelength at a non-polarization state of said optical band pass filter means is adjusted and set at a monitoring wavelength.

11. A laser oscillation wavelength monitoring device in accordance with claim 3, wherein:

a transmission center wavelength at a non-polarization state of said optical band pass filter means is adjusted and set at a monitoring wavelength.

12. A laser oscillation wavelength monitoring device in accordance with claim 4, wherein:

a transmission center wavelength at a non-polarization state of said optical band pass filter means is adjusted and set at a monitoring wavelength.

13. A laser oscillation wavelength monitoring device in accordance with claim 3, wherein:

said first calculating means, comprising:
  a first and a second analog/digital (A/D) converting means which convert analog output signals from said first and second optical/electric converting means to digital signals; and
  a first dividing means which outputs of said first and second A/D converting means are inputted to and outputs a result that one of the inputs is divided by the other of the inputs.

14. A laser oscillation wavelength monitoring device in accordance with claim 4, wherein:

said first calculating means, comprising:
  a first and a second analog/digital (A/D) converting means which convert analog output signals from said first and second optical/electric converting means to digital signals; and
  a first dividing means which outputs of said first and second A/D converting means are inputted to and outputs a result that one of the inputs is divided by the other of the inputs.

15. A laser oscillation wavelength monitoring device in accordance with claim 3, wherein:

said second calculating means, comprising:
  an adding means which accumulates the divided results outputted from said first dividing means every inputting clock signal of a designated cycle supplied from a clock generating means; and
  a counting means for counting said clock signals,
  said second calculating means outputs said accumulated result of said adding means at the time when the counted value of said counting means reach a predetermined value, and makes values in a memory means that temporarily memorizes the accumulated result at said adding means and counted values of said counting means clear.

16. A laser oscillation wavelength monitoring device in accordance with claim 4, wherein:

said second calculating means, comprising:
  an adding means which accumulates the divided results outputted from said first dividing means every inputting clock signal of a designated cycle supplied from a clock generating means; and
  a counting means for counting said clock signals,
  said second calculating means outputs said accumulated result of said adding means at the time when the counted value of said counting means reach a predetermined value, and makes values in a memory means that temporarily memorizes the accumulated result at said adding means and counted values of said counting means clear.

17. A laser oscillation wavelength monitoring device in accordance with claim 15, wherein:

said third calculating means, comprising:
  a second dividing means which outputs a value that said accumulated result from said adding means of said second calculating means is divided by said predetermined value.

18. A laser oscillation wavelength monitoring device in accordance with claim 16, wherein:

said third calculating means, comprising:
  a second dividing means which outputs a value that said accumulated result from said adding means of said second calculating means is divided by said predetermined value.

19. A laser oscillation wavelength monitoring device in accordance with claim 3, wherein:

said optical signals are transmitted in said optical fiber by using a wavelength division multiplex (WDM) technology.

20. A laser oscillation wavelength monitoring device in accordance with claim 4, wherein:

said optical signals are transmitted in said optical fiber by using a WDM technology.

* * * * *